Figure 1:
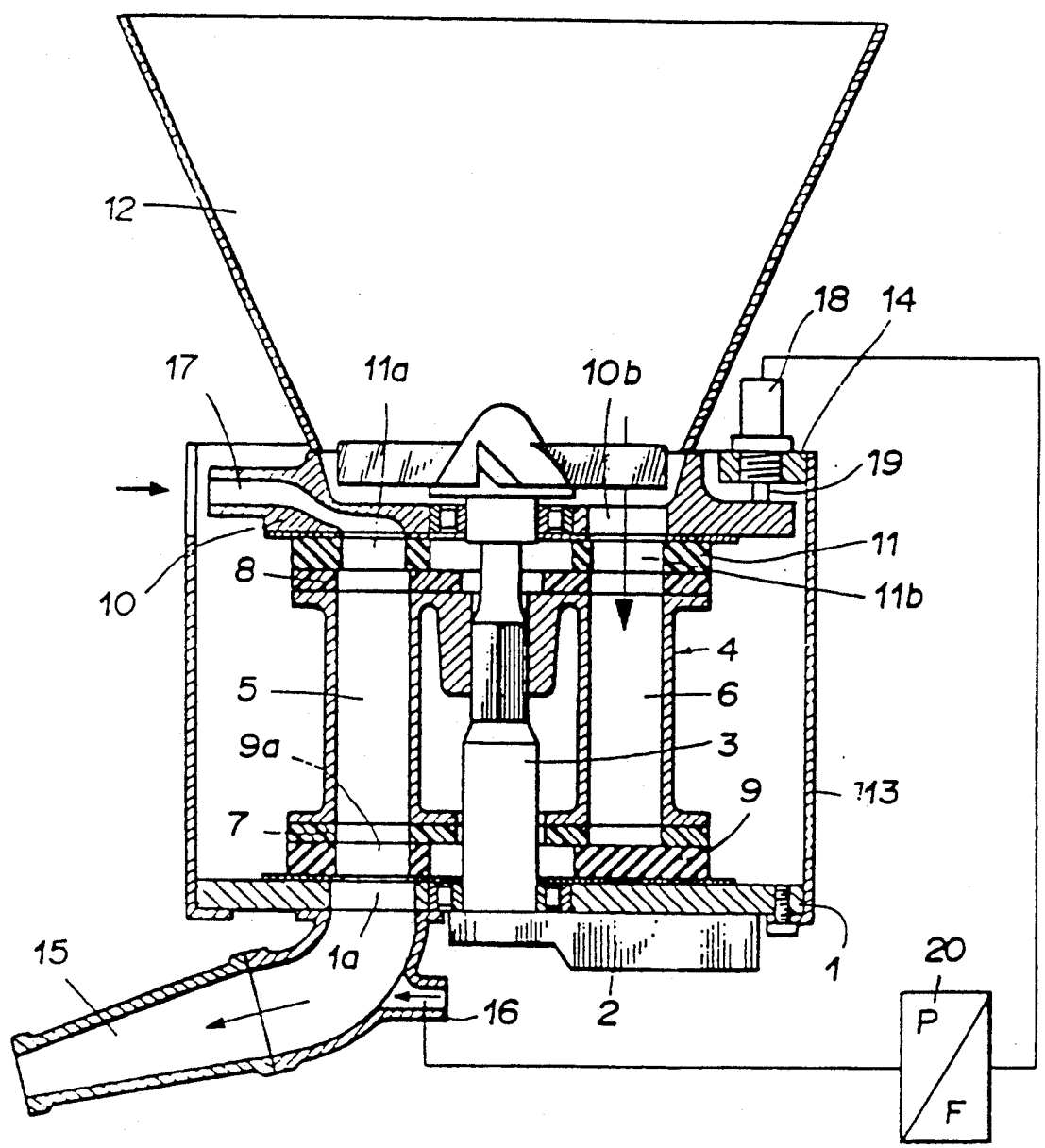

United States Patent [19]

Tschumi

[11] Patent Number: 5,076,501
[45] Date of Patent: Dec. 31, 1991

[54] SHOTCRETE GUN

[75] Inventor: Otto Tschumi, Frauenfeld, Switzerland

[73] Assignee: Sandoz Ltd., Basle, Switzerland

[21] Appl. No.: 505,863

[22] Filed: Apr. 6, 1990

[30] Foreign Application Priority Data

Apr. 8, 1989 [CH] Switzerland ................ 01305/89
Apr. 8, 1989 [CH] Switzerland ................ 01306/89

[51] Int. Cl.⁵ .................................... B65G 53/46
[52] U.S. Cl. ............................. 239/654; 222/370; 222/636; 406/64; 406/66
[58] Field of Search ............ 222/636, 370, 278; 239/654; 406/66, 67, 63, 64, 182; 277/3, 103, 113, 126, 147

[56] References Cited

U.S. PATENT DOCUMENTS

| | | | |
|---|---|---|---|
| 3,080,074 | 3/1963 | Hornbostel | 222/370 |
| 3,909,068 | 9/1975 | Coucher | 406/63 |
| 4,376,600 | 3/1983 | Egli | 406/64 |
| 4,462,719 | 7/1984 | Egger et al. | 406/64 |
| 4,528,848 | 7/1985 | Hafner | 406/63 |
| 4,681,484 | 7/1987 | Egger | 406/63 |
| 4,911,340 | 3/1990 | Abom | 222/636 |

FOREIGN PATENT DOCUMENTS

| | | | |
|---|---|---|---|
| 704740 | 3/1941 | Fed. Rep. of Germany | 222/370 |
| 2734311 | 2/1978 | Fed. Rep. of Germany . | |
| 633779 | 12/1949 | United Kingdom . | |
| 742675 | 12/1955 | United Kingdom . | |
| 923603 | 4/1963 | United Kingdom | 222/370 |
| 2026628 | 2/1980 | United Kingdom | 277/103 |

Primary Examiner—Andres Kashnikow
Assistant Examiner—Christopher G. Trainor
Attorney, Agent, or Firm—Gerald D. Sharkin; Richard E. Vila; Walter F. Jewell

[57] ABSTRACT

A shotcrete gun having a rotatable multichamber rotor, with a top feed hopper for receiving a dry concrete mixture in a chamber, and a bottom outlet pipe for discharging the dry concret mixture from the chamber. The outlet pipe having a compressed air connector for connection to a compressed air source. The upper surface of the drum rotor adjoins a gasket having one or more openings fixed to a clamping plate. The lower surface of the drum rotor adjoins a gasket which is fixed to a base plate. The hopper and the outlet pipe being spaced such that a chamber which communicates directly with the hopper can be moved so that it no longer communicates with the hopper but communicates with the outlet pipe. The clamping plate has a compressed air connector for blowing the dry mixture out into the outlet pipe, and at least three pressure cylinders in order to press the gasket against the drum rotor. Means are provided for maintaining the pressure in the cylinders proportional to the pressure in the outlet pipe.

12 Claims, 2 Drawing Sheets

SHOTCRETE GUN

Concrete spraying machines are known having a feed hopper for receiving dry concrete mixture and an outlet pipe, having a compressed air connector to a conveyer line. Between the hopper outlet and the outlet pipe, a motor-driven, multichamber drum rotor rotatable about a vertical axis is provided.

The upper surface of the rotor adjoins a gasket (the upper gasket) having an opening to allow concrete from the hopper to pass into chambers of the rotor, the upper gasket being fixed to a clamping plate with similar openings. The rotor also has a lower surface which adjoins a gasket (the lower gasket) having an opening for allowing concrete from chambers in the rotor to flow into the outlet pipe, the lower gasket being fixed to a base plate. The rotor has a number of chambers, for receiving concrete, capable of communicating at the top with the hopper and at the bottom with the outlet pipe but arranged in such a way that those chambers that communicate at the top through an opening with the hopper, do not, at the same time, communicate at the bottom with the outlet pipe. By rotation, however, a chamber which communicates directly with the hopper can be moved so that it no longer communicates at the top with the hopper but communicates at the bottom with the outlet pipe.

The clamping plate contains a compressed air connector to blow the dry mixture out of a chamber into the outlet pipe. The clamping plate (at the top) and the base plate (at the bottom) are fixed so that the rotor can rotate between them; the upper and lower gaskets separating the rotor from the plates.

For the avoidance of doubt in this Specification, when a chamber is described as communicating with the hopper or the outlet pipe, this means that concrete can pass into the chamber from the hopper or that concrete can pass from the chamber into the outlet pipe respectively.

The gaskets contact the drum rotor tightly, and clamping means are provided, so that the clamping plate presses the rotor against the base plate. In order to avoid a loss of compressed air, which brings with it dust and noise (associated with loss of compressed air), a good seal is necessary between the gaskets and the cylinder of the drum rotor, which has a friction disc on each of its upper and lower surfaces facing the plates.

As a result of the continuous wear and tear of these components, and the linear expansion of all components through temperature variations, the clamping means must be easily adjusted and operable so that the clamping means can be adapted to move at any time due to the changing conditions. Bolts with handwheel control or wing nuts are therefore normally used as clamping means, and are arranged on the periphery of the clamping plate, so that the clamping plate is secured evenly over its entire circumference. Clamping rings are also used, which are tightened with only a single screw and transfer pressure evenly to several points in the periphery of the clamping plate.

It has been found that in order to keep the pressure over the whole circumference constant for a long time, a pressure cylinder and a clamping ring or several pressure cylinders distributed over the circumference of the clamping plate can be used. This produces constant and good seal without the need for constant adjustment by the operating personnel, but has the disadvantage that wear and tear of the gaskets and the friction discs will tend to be correspondingly greater. It is an aim of the present invention to overcome this disadvantage whilst keeping advantages of the use of pressure cylinders.

According to the invention there is provided a concrete spraying machine comprising
 a) a feed hopper (12) for receiving a dry concrete mixture;
 b) an outlet pipe (15) having a compressed air connector (16) for connection to a compressed air source; and
 c) a motor-driven, multichamber drum rotor (4) rotatable around a vertical axis, arranged between the hopper outlet and the outlet pipe (15), the upper surface of the drum rotor adjoining a gasket (11) (hereinafter defined as the upper gasket) having one or more openings fixed to a clamping plate (10), and the lower surface of the drum rotor adjoining a gasket (9) (hereinafter defined as the lower gasket) which is fixed to base plate (1),
 whereby the rotor has one or more chambers (6), for receiving concrete, capable of communicating at the top with the hopper and at the bottom with the outlet pipe but arranged in such a way that those chambers (6) that communicate at the top through an opening with the hopper, do not, at the same time, communicate at the bottom with the outlet pipe (15) but which by rotation can be moved so that they no longer communicate at the top with the hopper (12) but communicate at the bottom with the outlet pipe (15) and
 whereby the clamping plate (10) contains a compressed air connector (17), for blowing the dry mixture out into the outlet pipe (15) and at least three pressure cylinders (18) in order to press the gaskets (9 and 11) against the drum rotor 4, characterized by having
 means (20) for providing that the pressure in the cylinders (18) is proportional to the pressure in the outlet pipe (15).

Preferably the means (20), for providing that the pressure in the cylinders (18) is proportional to that in outlet pipe (15), comprises a pneumatic-hydraulic pressure converter (20), the incoming circuit of which is connected to the outlet pipe (15) or to the compressed air connector (16) and the outgoing circuit of which is connected to the pressure cylinders (18).

Further according to the invention, there is provided a concrete spraying machine comprising
 a) a feed hopper (12) for receiving a dry concrete mixture;
 b) an outlet pipe (15) having a compressed air connector (16) for connection to a compressed air source; and
 c) a motor-driven, multichamber drum rotor (4) rotatable about a vertical axis, arranged between the hopper outlet and the outlet pipe (15), the upper surface of the drum rotor adjoining a gasket (11) (hereinafter defined as the upper gasket) having one or more openings fixed to a clamping plate (10) and the lower surface of the drum rotor adjoining a gasket (9) (hereinafter defined as the lower gasket) which is fixed to a base plate (1),
 whereby the rotor has one or more chambers (6), for receiving concrete, capable of communicating at the top with the hopper and at the bottom with outlet pipe but arranged in such a way that those chambers (6) that communicate at the top through an opening with the hopper, do not, at the same time, communicate at the bottom with outlet pipe (15) but which by rotation can be moved so that they no longer communicate at the top with the hopper (12) but communicate with the outlet pipe (15) and whereby the clamping plate (10) contains a compressed air connector (17), for blowing the dry mixture out into the outlet pipe (15) and at least three pressure cylinders (18) in order to press the gaskets (9 and 11) against the drum rotor (4), characterized by having the pressure cylinders located in a ring (14), which ring is located on the upper edge of a casing (113, 115) which extends from the base plate (1) to the clamping plate (10) and is attached to the base plate (1) by detachable means (22a and 23).

Preferably, means (20) are provided for providing that the pressure in cylinders (18) is proportional to the pressure in the outlet pipe (15). Preferably, means (20) is as described above.

Preferably, the detachable means comprises radially extending teeth (22a) that extend from a ring (22) attached to the base plate or extend from the base plate (1) itself, which teeth are adapted to engage a surface in recesses in a flange (23) attached to the casing (113 and 115) in the lower region of the casing to be connected to the base plate (1) or to engage a surface in recesses in the casing (113, 115) itself, in the lower region of the casing to be connected to the base plate (1).

Alternatively, the detachable means comprises radially extending teeth in a ring to be attached to the casing (113, 115) in the lower region of the casing to be connected to the base plate (1) or in the casing (113, 115) itself in the lower region of the casing to be connected to the base plate (1), said teeth being adapted to engage a surface in recesses in a flange attached to the base plate (1) or to engage a surface in recesses in the base plate (1) itself.

Preferably, the casing (113, 115) comprises two hollow cylinders (113, 115) arranged one above the other, which are detachably connected to one another, preferably by means of clamp collar (116, 117).

Preferably the two hollow cylinders (113, 115) of the casing are such that the upper cylinder (113) has a lower edge (113a) that is above an upper edge (115a) of the lower cylinder (115) and that the lower edge (113a) has one or more radially and outwardly extending projections on which a ring (116) rests and at the lower side of the said ring, hook-like holders (117) are arranged, the radially and inwardly pointing ends (117a) of which engage the upper notched edges (115a) of the lower cylinder (115), such that when the ring (116) is rotated by half a pitch of the holders, the upper cylinder (113) can be removed from the lower cylinder (115).

Preferably, the height of the lower cylinder (115) is substantially the height of the drum rotor (4).

Preferably the drum rotor (4) has nine or ten chambers.

Figure 2:
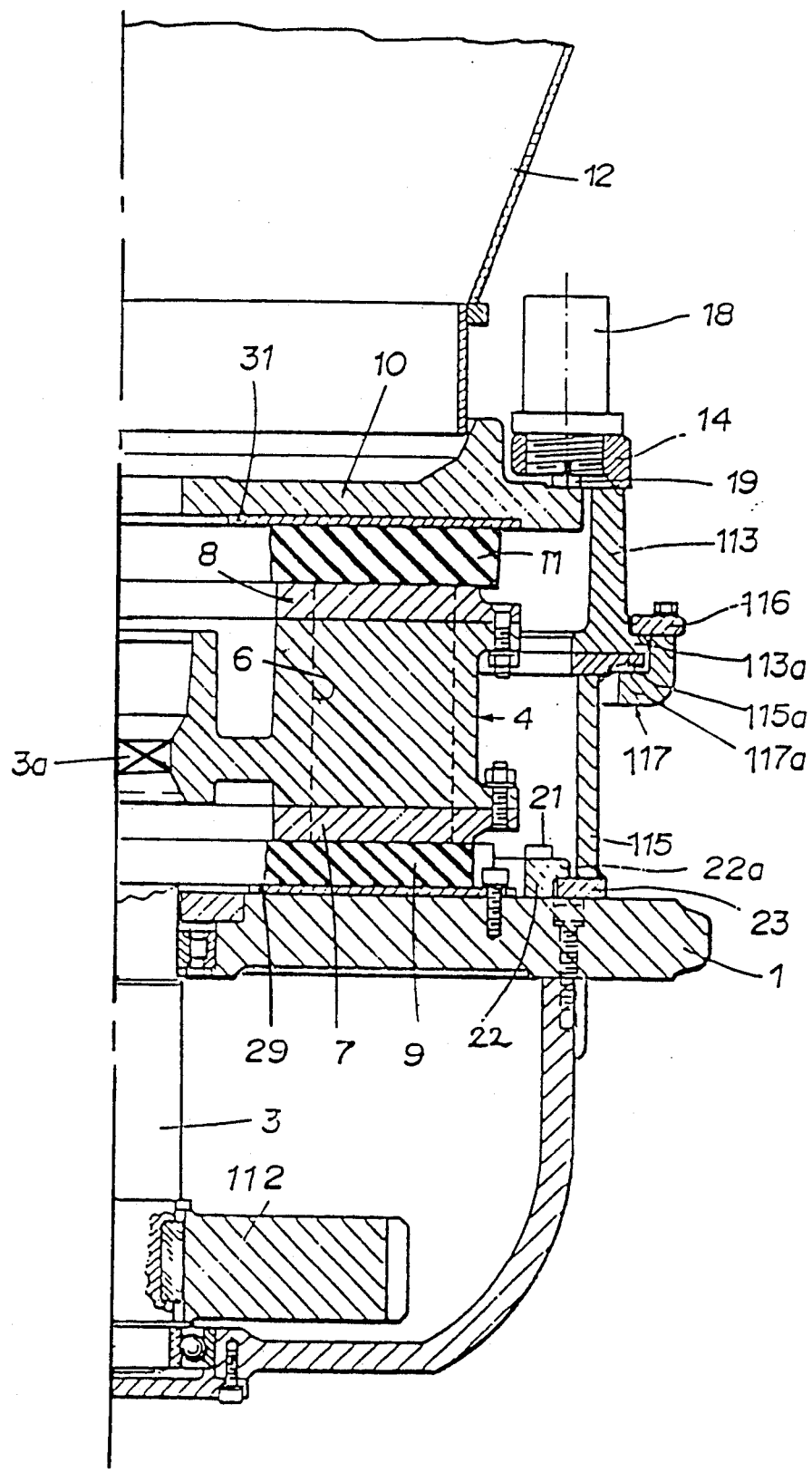

The invention will be exemplified by FIGS. 1 and 2, FIG. 1 which shows a vertical section through a concrete spraying machine according to the invention. The individual components are shown purely schematically. FIG. 2 shows the right half of a vertical section through a further embodiment of a machine according to the invention.

In FIG. 1, a drive unit 2 located on a base plate 1 is shown. The unit 2 drives a spindle 3, running vertically through the base plate 1, of the drum rotor 4. This drum rotor 4 has ten internal chambers having parallel axes, two of which (5, 6) are visible in FIG. 1. The lower surface of the drum rotor 4 adjoins a friction disc 7 and the upper surface adjoins a friction disc 8. A lower annular rubber gasket 9 is fixed to the base plate 1, and the friction disc 7 rests on this gasket 9, being positioned to be vertically slidable, so that the facing surfaces can be brought to bear tightly on the gasket 9 if these two parts have become thinner due to wear and tear. At the top end of the drum rotor is located a clamping plate 10. On its lower side, it has an annular rubber gasket 11. A feed hopper 12 is located in or on the clamping plate 10. The feed hopper 12 may be rigidly or loosely fixed to the plate 10, or may simply rest thereon. A casing 113, which has a strong ring 14 at its upper edge, is fixed to the base plate 1. At least three hydraulic cylinders 18 are screwed into this ring 14 at regular intervals, and the piston rods 19 thereof exert force on the edge of the clamping plate 10 by applying pressure from above, and pressing the clamping plate 10 towards the base plate 1, with the result that the gaskets 9 and 11 rest satisfactorily on the surfaces of the friction discs 7 and 8 on the drum rotor 4.

An outlet pipe 15 is located at the bottom of the base plate 1, which pipe 15 is connected to a concrete feed pipe. Outlet pipe 15 has a compressed air connector 16, so that the concrete present in the outlet pipe 15 can be conveyed, by the pressurised air streaming in, through the feed pipe (not illustrated in the figure) attached to the outlet pipe 15. In order that the concrete may reach the outlet pipe 15, the base plate 1 and the gasket 9 fixed thereto have corresponding openings 1a and 9a. To facilitate and accelerate the fall of concrete from the chamber 5 located over this opening 1a, the clamping plate 10 has an external compressed air connector 17, which opens into the aperture 11a in the gasket 11 which is above the opening 1a and 9a.

A further opening 10b in the clamping plate 10 and a further opening 11b in the gasket 11 enables the concrete due to gravity to pass from the hopper 12 into the chamber 6. As the drum rotor 4 rotates, the chamber 6 passes to the position at which chamber 5 is situated in FIG. 1, and is then emptied as described above.

It is preferable that the piston rods 19 of the hydraulic cylinders 18 do not exert more force than is necessary to compress the vertically movable parts upon rotation of the drum rotor tightly. In other words, so that the force is sufficient to close tightly the hollow cavities containing and directing the compressed air, without however, too great a pressure which would accelerate wear and tear of the parts rotating against one another. The pressure cylinders 18 are linked by a pneumatic-hydraulic pressure converter 20 to the entrance of the compressed air connector 16 in the outlet pipe 15 or to the compressed air pipe 16, so that the pressure acting on the pressure cylinders 18 is always proportional to the pressure in the outlet pipe 15. With this control, when the pressure in chamber 5 increases, the pressure acting on the clamping plate 10 increases, thus preventing any leakage between one of the gaskets and the base plate 1 or the clamping plate 10 where dust-filled compressed air can escape. When the pressure in the outlet pipe 15 drops, the pressure on the clamping plate 10 is also reduced. Thus, the friction between the parts sliding on top of one another does not increase when the internal pressure in a chamber 5 (which communicates with outlet pipe 15) decreases and as a consequence, these parts have a longer life. In addition, the machine is less noisy in operation.

In FIG. 2, below the base plate 1, a drive unit is located (not shown) which transfers the torque from a motor (not shown) to a gear 112 rigidly connected to spindle 3. The drum rotor 4 rests on a six edged segment 3a of spindle 3 and has ten internal chambers having parallel axes, one of which is visible in FIG. 2 marked as 6. The upper surface of the rotor adjoins a friction disc 8 and the lower surface of the rotor adjoins a friction disc 7, both of which are firmly connected to the rotor as described for FIG. 1. The lower gasket 9, which has a vulcanised steel plate 29 is screwed into the base plate 1 and friction disc 7 rests on this gasket. The clamping plate 10 with gasket 11 on its lower side is furnished with a vulcanised steel plate 31 and contact the friction disc 8. Hydraulic cylinders 18 are so arranged to press the clamping plate 10 against the base plate 1 in order to allow a tight seal between the friction discs 7 and 8 and the lower and upper gaskets 9 and 11 respectively. The hydraulic cylinders (3 to 8 cylinders may be present according to the size of the machine) are screwed into a strong ring 14 so that when the cylinders are placed under pressure, their piston rods extend onwards and can exert force on the edge of the clamping plate 10. The ring 14 is itself firmly connected to an upper hollow cylinder 113. The lower edge 113a of cylinder 113 rests on the upper edge 115a of a lower cylinder 115. These two edges 113a and 115a are outwardly extending projections. On the lower edge 113a of the upper hollow cylinder 113, a ring 116 is located on whose lower side are arranged radially and inwardly pointed ends 117a of a radially and evenly distributed hook-like holders 117, which can engage the upper notched edge 115a of the lower hollow cylinder 115. Thus, by rotating the clamp collar so formed by half a pitch of the holders, the upper cylinder 113 can be removed from the lower cylinder 115. The lower cylinder 115 is fixed to the base plate 1 by means of teeth 22a of a lower joining ring 22 which is screwed into the base plate 1 with screws 21. Its teeth 22a radially engage a flange 23 forming the lower end of the cylinder 115, the flange having radially extending notches so that when ring 22 is rotated by half a pitch, the hollow cylinder 115 can be removed from the base plate 1.

When the concrete spraying machine is set in operation, the pressure cylinders 18 cause the piston rods to extend downwards and press the clamping plate 10 downwards thereby holding all the parts together, as described above, with sufficient force. Through this pressure, the two hollow cylinders 113 and 115 forming the casing cause the flange 23 of the lower hollow cylinder 115 to be pressed firmly against the teeth 22a so that it can no longer be twisted. The clamp collar formed by the ring 116 and the holders 117 is pressed firmly against the two edges of the hollow cylinders 113 and 115 which are coupled by the collars so they can no longer twist out of alignment. In this way, the machine cannot be operated without the casing (which serves as a dust protector) being in position. Furthermore the casing has internally and/or externally a sound proofing cover (not shown) thereby reducing the noise of the machine even further. Once the machine is switched off, the piston rods 19 withdraw from pressure plate 10 so that no pressure is exerted on the parts situated between the pressure plate 10 and the base plate 1 and no tension is exerted on the parts that form the case. The individual parts then can easily be untwisted and released from one another. When the upper holder ring 16 is twisted by a half a pitch, the inwardly pointed end 17a pass through the inwardly pointing projections of the edge 115a and the clamping plate 10 can be removed, together with the hopper 12 resting thereon, the gasket 11 fixed thereto and the upper hollow cylinder attached to the clamping plate 10 together with pressure cylinders 18. Drum rotor 4 then is easily accessible and removable since it is only seated on the six edged segment 3a of the spindle 3. If this drum rotor is replaced by a drum rotor of a different height, the lower hollow cylinder 115, whose height should conform with the height of the drum cylinder can easily be exchanged.

What is claimed is:

1. A concrete spraying machine comprising—
   a) a feed hopper (12) having an outlet for receiving a dry concrete mixture;
   b) an outlet pipe (15) having a compressed air pipe (16) for connection to a compressed air source; and
   c) a motor-driven, multichamber drum rotor (4) having an upper surface and a lower surface and being rotable around a verticle axis, arranged between the hopper outlet and the outlet pipe (15), the upper surface of the drum rotor adjoining a gasket (11), hereinafter defined as the upper gasket, having one or more openings fixed to a clamping plate (10), and the lower surface of the drum rotor adjoining a gasket (9), hereinafter defined as the lower gasket, which is fixed to base plate (1), whereby the rotor has one or more chambers (6), for receiving the concrete mixture, each of said chamber being capable of communicating at a upper end with the hopper and at its lower end with the outlet pipe but arranged in such a way that the chambers (6) that communicate at the upper ends thereof through an opening with the hopper, do not, at the same time, communicate at the lower ends thereof with the outlet pipe (15) and whereby the clamping plate (10) contains a compressed air connector (17), to permit entrance of compressed air, for blowing the dry mixture out into the outlet pipe (15), and at least three pressure cylinders (18) in order to press the gaskets (9 and 11) against the drum rotor 4, characterized by having means (20) for providing that the pressure in the cylinders (18) is proportional to the pressure in the outlet pipe (15).

2. A machine according to claim 1 in which the means (20) for providing that the pressure in the cylinders (18) is proportional to that in the outlet pipe (15), comprises a pneumatic-hydraulic pressure converter (20), an incoming circuit of which is connected to the outlet pipe (15) or to the compressed air pipe (16) and an outgoing circuit of which is connected to the pressure cylinders (18).

3. A concrete spraying machine comprising—
   a) a feed hopper (12) having an outlet for receiving a dry concrete mixture;
   b) an outlet pipe (15) having a compressed air pipe (16) for connection to a compressed air source; and
   c) a motor-driven, multichamber drum rotor (4) having an upper surface and a lower surface and being rotatable about a vertical axis, arranged between the hopper outlet and the outlet pipe (15), the upper surface of the drum rotor adjoining a gasket (11), hereinafter defined as the upper gasket, having one or more openings fixed to a clamping plate (10) and the lower surface of the drum rotor adjoining a gasket (9), hereinafter defined as the lower gasket, which is fixed to a base plate (1), whereby the rotor has one or more chambers (6), for receiving the concrete mixture, each of said chamber being capable of communicating at its upper end with the hopper and at a lower end with the outlet pipe (15) but arranged in such a way that those the chambers (6) that communicate at the upper ends thereof through an opening with the hopper, do not, at the same time, communicate at the lower ends thereof with outlet pipe (15) and whereby the clamping plate (10) contains a compressed air connector (17), to permit the entrance of compressed air, for blowing the dry mixture out into the outlet pipe (15), and at least three pressure cylinders (18) in order to press the gaskets (9 and 11) against the drum rotor (4), characterized by having the pressure cylinders located in a ring (14), the ring being located on an upper edge of a casing (113, 115) which extends from the base plate (1) to the clamping plate (10) and is attached to the base plate (1) by detachable means (22a and 23).

4. A machine according to claim 3 in which means (20) are provided for providing that the pressure in cylinders (18) is proportional to the pressure in the outlet pipe (15).

5. A machine according to claim 4 in which the means (20) for providing the pressure in the cylinders (18) is proportional to that in the outlet pipe (15) comprises a pneumatic-hydraulic pressure converter (20), an incoming circuit of which is connected to the outlet pipe (15) or to the compressed air pipe (16) and an outgoing circuit of which is connected to the pressure cylinders (18).

6. A machine according to claim 3 in which the detachable means comprises radially extending teeth (22a) that extend from a toothed ring (22) attached to the base plate (1) or which extends from the base plate itself, the teeth being adapted to engage a surface in recesses in a flange (23) attached to or integrally formed with the casing (113 and 115) in a lower region of the casing.

7. A machine according to claim 3 in which the detachable means comprises radially extending teeth in a ring to be attached to or integrally formed with the casing (113 and 115) in a lower region of the casing, said teeth being adapted to engage a surface in recesses in a flange attached to or integrally formed with the base plate (1).

8. A machine according to claim 3 in which the casing (113, 115) comprises two hollow cylinders (113, 115) arranged one above the other, which are detachably connected to one another, by means of a clamp collar (116, 117).

9. A machine according to claim 3 in which the casing comprises two hollow cylinders comprising an upper and a lower cylinder (113 and 115) which are disposed such that the upper cylinder (113) has a lower edge (113a) that is above an upper edge (115a) of the lower cylinder (115) and that the lower edge (113a) has one or more radially and outwardly extending projections on which a ring (116) rests, a lower side of the said ring comprising hook-like holders (117) having radially and inwardly pointing ends (117a) which engage upper notched edges (115a) of the lower cylinder (115), such that when the ring (116) is rotated by half a pitch of the holders, the upper cylinder (113) can be removed from the lower cylinder (115).

10. A machine according to claim 9 in which the height of the lower cylinder (115) is substantially the height of the drum rotor (4).

11. A machine according to claim 1 in which the drum rotor (4) has nine or ten chambers.

12. A machine according to claim 3 in which the drum rotor (4) has nine or ten chambers.

* * * * *